(12) United States Patent
Ross et al.

(10) Patent No.: US 12,480,780 B2
(45) Date of Patent: Nov. 25, 2025

(54) NAVIGATING WITH MOBILE DEVICE AND HEAD-WORN DEVICE

(71) Applicants: Christopher Ross, Brooklyn, NY (US); Google LLC, Mountain View, CA (US)

(72) Inventors: Christopher Ross, Brooklyn, NY (US); Juo-Hsin Chen, Brooklyn, NY (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 18/993,381

(22) PCT Filed: Apr. 4, 2023

(86) PCT No.: PCT/US2023/017381
§ 371 (c)(1),
(2) Date: Jan. 10, 2025

(87) PCT Pub. No.: WO2024/210888
PCT Pub. Date: Oct. 10, 2024

(65) Prior Publication Data
US 2025/0231039 A1    Jul. 17, 2025

(51) Int. Cl.
*G01C 21/00* (2006.01)
*G01C 21/36* (2006.01)
*G06F 3/00* (2006.01)
*G06F 3/01* (2006.01)
*G06F 3/14* (2006.01)

(52) U.S. Cl.
CPC ......... *G01C 21/3661* (2013.01); *G06F 3/012* (2013.01); *G06F 3/14* (2013.01)

(58) Field of Classification Search
CPC ........ G01C 21/3661; G06F 3/012; G06F 3/14

USPC ......................................................... 701/428
See application file for complete search history.

(56) References Cited

U.S. PATENT DOCUMENTS

| | | |
|---|---|---|
| 11,047,693 B1 | 6/2021 | Schaefer |
| 2012/0050144 A1 | 3/2012 | Morlock |
| 2019/0234740 A1 | 8/2019 | Gabbay et al. |
| 2021/0204092 A1* | 7/2021 | Inoue ..................... H04W 4/023 |

(Continued)

FOREIGN PATENT DOCUMENTS

| | | | |
|---|---|---|---|
| EP | 3982083 A1 | 4/2022 | |
| WO | WO-2020049330 A1 * | 3/2020 | ............. G01C 21/20 |

OTHER PUBLICATIONS

International Search Report and Written Opinion for PCT Application No. PCT/US2023/017381, mailed on Nov. 9, 2023, 15 pages.

(Continued)

*Primary Examiner* — Tiffany P Young
(74) *Attorney, Agent, or Firm* — Brake Hughes Bellermann LLP

(57) ABSTRACT

A mobile device may present a map, the map including a location indication, the location indication indicating a location of a destination. The mobile device may determine that a user has looked away from the mobile device. The mobile device may, in response to determining that the user has looked away from the mobile device, send a direction instruction to a head-mounted device, the direction instruction instructing the head-mounted device to present a direction indication, the direction indication indicating a direction for the user to travel to arrive at the destination, the head-mounted device being mounted on a head of the user.

19 Claims, 14 Drawing Sheets

(56) References Cited

U.S. PATENT DOCUMENTS

2021/0303107 A1\*  9/2021  Pla I Conesa .......... G06F 3/012
2021/0349528 A1   11/2021  Son et al.
2023/0061424 A1\*  3/2023  Kato .................... B60K 28/066

OTHER PUBLICATIONS

Baldwin, "Google Map' AR Adds Navigation Hints to the Real World", Engadget, https://www.engadget.com/2019-02-11-google-maps-ar-directions.html, Feb. 11, 2019, 5 pages.

"Google Maps AR First Look: Helping you navigate the city", Engadget, https://www.youtube.com/watch?v=XWbY5jdJnHg, Feb. 12, 2019, 3 pages.

\* cited by examiner

NAVIGATING WITH MOBILE DEVICE AND HEAD-WORN DEVICE

CROSS-REFERENCE TO RELATED APPLICATION

This application is a 35 U.S.C. § 371 National Phase Entry Application from PCT/US2023/017381, filed on Apr. 4, 2023, entitled "NAVIGATING WITH MOBILE DEVICE AND HEAD-MOUNTED DEVICE", the disclosure of which is incorporated herein by reference in its entirety.

TECHNICAL FIELD

This description relates to navigation.

BACKGROUND

Mobile devices can present maps and directions for a user to arrive at a destination. Looking at the map on the mobile device while walking toward the destination can be distracting.

SUMMARY

A mobile device sends a direction instruction to a head-mounted device when a user looks away from the mobile device. The mobile device initially presents a map and indicates a location of a destination. The user can look at the map and then look away from the mobile device. In response to the user looking away from the mobile device, the mobile device sends a direction instruction to a head-mounted device worn by the user. The direction instruction instructs the head-mounted device to present a direction indication to the user. The direction indication indicates a direction for the user to travel to arrive at the destination. The user can view the direction indication within the head-mounted device while walking and viewing the surrounding physical environment.

Determining that the user has looked away from the mobile device may include determining that the user has looked away from the mobile device based on an orientation, movement and/or acceleration of the head-mounted device. For example, determining that the user has looked away from the mobile device may include determining that the orientation of the head-mounted device relative to ground or the horizon exceeds a predetermined threshold angle. The orientation of the head-mounted device may be given by the orientation of a normal direction of a front face of the head-mounted device. Further, the angle of the head-mounted device relative to ground or the horizon may be measured by at least one sensor of the head-mounted device such as an inertial measurement unit (IMU), an accelerometer, a gyroscope and/or a magnetometer. The head-mounted device may send at least one sensor signal to the mobile device. The mobile device may then determine, based on the received signal, whether or not the orientation angle exceeds the threshold. It is also possible that the head-mounted device itself determines whether or not the orientation angle exceeds the threshold and—if this is the case—sends a corresponding signal to the mobile device.

Further, determining that the user has looked away from the mobile device may include determining that a distance between the mobile device and the head-mounted device exceeds a predetermined threshold distance. Whether or not the threshold distance has been reached may be determined based on a strength of a communication signal between the mobile device and the head-mounted device (such as a Bluetooth signal) or based on a location sensor data (e.g., data of a positioning system such as GPS).

Moreover, determining that the user has looked away from the mobile device may include determining that a speed or an acceleration of the mobile device and/or the head-mounted device exceeds a predetermined threshold speed or acceleration (e.g., based on values measured by an IMU sensor of the head-mounted device).

The determining that the user has looked away from the mobile device may also be performed based on data of an optical sensor of the mobile device and/or the head-mounted device. For example, the optical sensor comprises or consists of a camera of the mobile device and/or the head-mounted device, wherein determining that the user has looked away from the mobile device includes determining that an image captured by the camera of the head-mounted device does not include (show) the mobile device or at least not the entire mobile device. Also, an image produced by a camera of the mobile device (e.g., a gaze-tracking camera) may be used for determining that the user has looked away from the mobile device as described further below.

In some aspects, the techniques described herein relate to a method performed by a mobile device. The method includes presenting a map, the map including a location indication, the location indication indicating a location of a destination; determining that a user has looked away from the mobile device; and in response to determining that the user has looked away from the mobile device, sending a direction instruction to a head-mounted device, the direction instruction instructing the head-mounted device to present a direction indication, the direction indication indicating a direction for the user to travel to arrive at the destination, the head-mounted device being mounted on a head of the user.

In some aspects, the techniques described herein relate to a method performed by a head-mounted device. The method includes orienting away from a mobile device; receiving a direction instruction from the mobile device; and presenting, based on the direction instruction, a direction indication, the direction indication indicating a direction to travel to arrive at a destination.

In some aspects, the techniques described herein relate method performed by a head-mounted device. The method include determining that a user wearing the head-mounted device has looked away from a mobile device and/or sending a signal to the mobile device based on an orientation of the head-mounted device that permits the mobile device to determine that the user has looked away from the mobile device; in response to determining that the user has looked away from the mobile device receiving a direction instruction from the mobile device; and presenting, based on the direction instruction, a direction indication, the direction indication indicating a direction to travel to arrive at a destination.

In some aspects, a non-transitory computer-readable storage medium comprises instructions stored thereon. When executed by at least on processor, the instructions are configured to cause a mobile device to present a map, the map including a location indication, the location indication indicating a location of a destination; determine that a user has looked away from the mobile device; and in response to determining that the user has looked away from the mobile device, send a direction instruction to a head-mounted device, the direction instruction instructing the head-mounted device to present a direction indication, the direction indication indicating a direction for the user to travel to arrive at the destination, the head-mounted device being mounted on a head of the user.

In some aspects, a mobile device comprises at least one processor and a non-transitory computer-readable storage medium comprising instructions stored thereon. When executed by the at least on processor, the instructions are configured to cause the mobile device to present a map, the map including a location indication, the location indication indicating a location of a destination; determine that a user has looked away from the mobile device; and in response to determining that the user has looked away from the mobile device, send a direction instruction to a head-mounted device, the direction instruction instructing the head-mounted device to present a direction indication, the direction indication indicating a direction for the user to travel to arrive at the destination, the head-mounted device being mounted on a head of the user.

In some aspects, a non-transitory computer-readable storage medium comprising instructions stored thereon. When executed by at least on processor, the instructions are configured to cause a head-mounted device to orient away from a mobile device; receive a direction instruction from the mobile device; and present, based on the direction instruction, a direction indication, the direction indication indicating a direction to travel to arrive at a destination.

In some aspects, a non-transitory computer-readable storage medium comprising instructions stored thereon. When executed by at least on processor, the instructions are configured to cause a head-mounted device to determine that a user wearing the head-mounted device has looked away from a mobile device and/or send a signal to the mobile device based on an orientation of the head-mounted device that permits the mobile device to determine that the user has looked away from the mobile device; in response to determining that the user has looked away from the mobile device, receive a direction instruction from the mobile device; and present, based on the direction instruction, a direction indication, the direction indication indicating a direction to travel to arrive at a destination.

In some aspects, a head-mounted device comprises at least one processor and a non-transitory computer-readable storage medium comprising instructions stored thereon. When executed by the at least on processor, the instructions are configured to cause the head-mounted device to orient away from a mobile device; receive a direction instruction from the mobile device; and present, based on the direction instruction, a direction indication, the direction indication indicating a direction to travel to arrive at a destination.

In some aspects, a head-mounted device comprises at least one processor and a non-transitory computer-readable storage medium comprising instructions stored thereon. When executed by the at least on processor, the instructions are configured to cause the head-mounted device to determine that a user wearing the head-mounted device has looked away from a mobile device and/or send a signal to the mobile device based on an orientation of the head-mounted device that permits the mobile device to determine that the user has looked away from the mobile device; in response to determining that the user has looked away from the mobile device, receive a direction instruction from the mobile device; and present, based on the direction instruction, a direction indication, the direction indication indicating a direction to travel to arrive at a destination.

In some aspects, the techniques described herein relate to a system including a mobile device and a head-mounted device. The mobile device is configured to present a map, the map including a location indication, the location indication indicating a location of a destination; determine that a user has looked away from the mobile device; and in response to determining that the user has looked away from the mobile device, send a direction instruction to a head-mounted device. The head-mounted device is configured to receive the direction instruction from the mobile device; and present, based on the direction instruction, a direction indication, the direction indication indicating a direction to travel to arrive at the destination.

The details of one or more implementations are set forth in the accompanying drawings and the description below. Other features will be apparent from the description and drawings, and from the claims.

BRIEF DESCRIPTION OF THE DRAWINGS

Like reference numbers refer to like elements.

DETAILED DESCRIPTION

Mobile devices can include mapping applications that present a map and directions to a destination. Looking at the map while walking to the destination can be distracting. To enable the user to walk to the destination without looking at the mobile device, the mobile device sends direction instructions to the head-mounted device. The head-mounted device responds to the direction instructions by presenting a direction indication. The direction indication indicates a direction for the user to travel to arrive at the destination.

To avoid presenting unnecessary information while the user is already looking at the mobile device, the mobile device sends the direction instructions to the head-mounted device when, and/or in response to, the user looking away from the mobile device. The mobile device thereby prompts the head-mounted device to present the direction indication when the user is actually walking to the destination, rather than while the user is looking at the mobile device and may be selecting a destination.

Figure 1A:
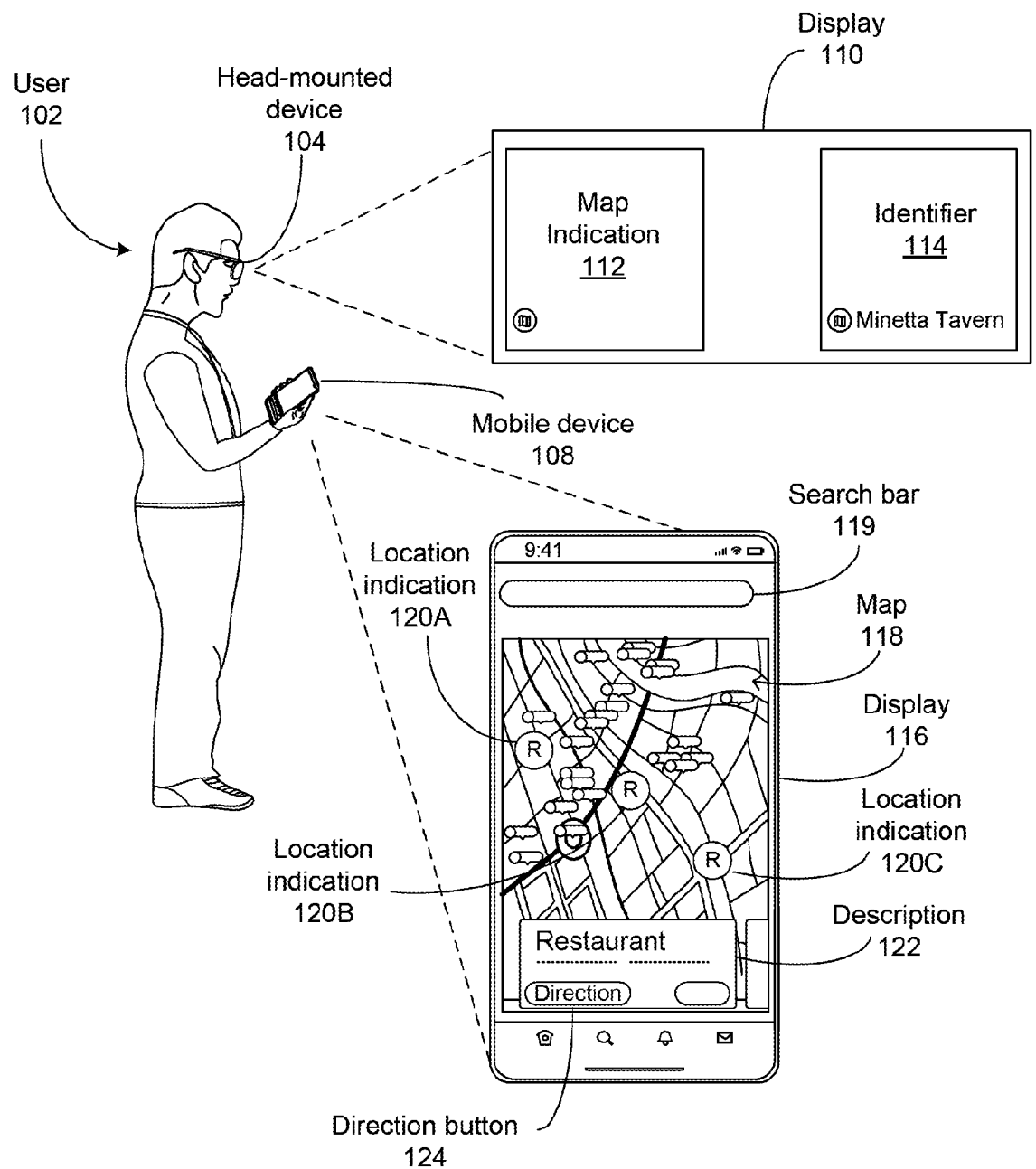
FIG. 1A shows a user wearing a head-mounted device while looking at a map presented by a mobile device held by the user.

FIG. 1A shows a user 102 wearing a head-mounted device 104 while looking at a map 118 presented by a mobile device 108 held by the user 102. The user 102 can hold the mobile device 108 in a hand of the user 102 while wearing the head-mounted device 104 on a head of the user 102. The user 102 can interact with, and/or provide input to, the mobile device 108 via a touchscreen, for example. The head-mounted device 104 may include any type of device mounted to a user's head such as, for example, glasses, goggles, helmets, headsets, and the like as non-limiting examples. In some examples, the head-mounted device 104 can include smartglasses and/or augmented reality (AR) glasses, and can present translucent output to the user 102 on lenses of the head-mounted device 104. The head-mounted device 104 is in wireless communication with the mobile device 108, such as via a Bluetooth connection.

The mobile device 100 can include a smartphone, a tablet, a phablet, or smartwatch, as non-limiting examples. The mobile device 108 can include a display 116. The display 116 presents graphical output. In some examples, the display 116 can include a touchscreen, and can receive touch input.

The display 116 presents an application, such as a mapping application, in response to input from the user 102 to launch the application. In the example shown in FIG. 1A, the display 116 presents a map 118 in response to the user 102 requesting the mobile device 108 to launch the mapping application. The map 118 can include streets and/or landmarks that are near a location of the user 102. The mobile device 108 may have determined the location of the user 102 based on global positioning system (GPS) signals, signals from one or more base stations in communication with the mobile device 108, based on signals from Institute for Electrical and Electronics Engineers (IEEE) 802.11 access points in communication with the mobile device 108, and/or based on signals received from other mobile devices, as non-limiting examples.

The display 116 can present a search bar 119. The search bar 119 can receive search queries from the user 102. The search queries can include key terms for searches of types of destinations, such as restaurants or hotels. The application (such as the mapping application) can respond to the query by presenting location indications 120A, 120B, 120C of potential destinations associated with, described by, and/or that match the search query inputted into the search bar 119. The application can present the location indications 120A, 120B, 120C of potential destinations near the user 102 on the map 118.

The application, such as the mapping application, can also present a description 122 of one of the potential destinations. The description 122 can include a name of the potential destination, one or more images associated with the destination (such as photographs of the destination and/or goods or services provided at the destination), one or more reviews of the potential destination, and/or an indication of how expensive the potential destination is. In some examples, the user 102 can scroll through descriptions (that include the description 122), which can be included in a carousel of cards, such as by swiping or tapping on the description 122, to view descriptions of other potential destinations. In the example shown in FIG. 1A, the description 122 is associated with the potential destination associated with the location indication 120A.

In some examples, the description 122 can include a direction button 124. The user 102 can select the direction button 124 by tapping, clicking, or pressing the direction button 124, as non-limiting examples. The mapping application executing on the mobile device 108 can respond to selection of the direction button 124 by presenting turn-by-turn directions to the destination described by and/or associated with the description 122.

The head-mounted device 104 can include an augmented reality (AR) headset in which the user 102 can view the physical environment through a transparent lens(es), with the head-mounted device 104 adding images to the lens(s) for the user to view. The head-mounted device 104 includes a display 110. In some examples, the display 110 included in the head-mounted device 104 can be included in (and/or project onto) one or both lenses of the head-mounted device 104, as shown in greater detail in FIG. 5B. The display 110 can present information to the user 102 that can assist the user 102 in navigating toward the destination.

While the user 102 is looking at the mobile device 108, the display 110 can present a map indication 112 and/or an identifier 114. In some examples, the display 110 will present only one of the map indication 112 or the identifier 114. In some examples, the display 110 will initially present the map indication 112, and present the identifier 114 after the user 102 has selected a destination identified by the identifier 114 after the user 102 has selected the destination, such as by selecting the direction button 124. The display 110 presents the map indication 112 and/or identifier 114 (as well as direction indications 126A, 126B, 130 and description 127 described below) in a corner portion(s) of the display 110 and/or lens(es) so as to reduce the extent to which the map indication 112 and/or identifier 114 distracts the user 102 from viewing the physical environment. The display 110 can present the map indication 112 in response to receiving a map signal and/or map message from the mobile device 108. The mobile device 108 can send the map signal and/or map message to the head-mounted device 104 in response to launching the mapping application. The map indication 112 can include a folded map. The map indication 112 can indicate to the user that the head-mounted device 104 and/or mobile device 108 provides mapping and/or navigation functions.

The display 110 presents the identifier 114 in response to the head-mounted device 104 receiving a location identifier signal and/or location identifier message from the mobile device 108. The mobile device 108 sends the location identifier signal and/or location identifier message in response to presenting the description 122, the user 102 selecting the description 122, and/or in response to the user 102 selecting the direction button 124.

Figure 1B:
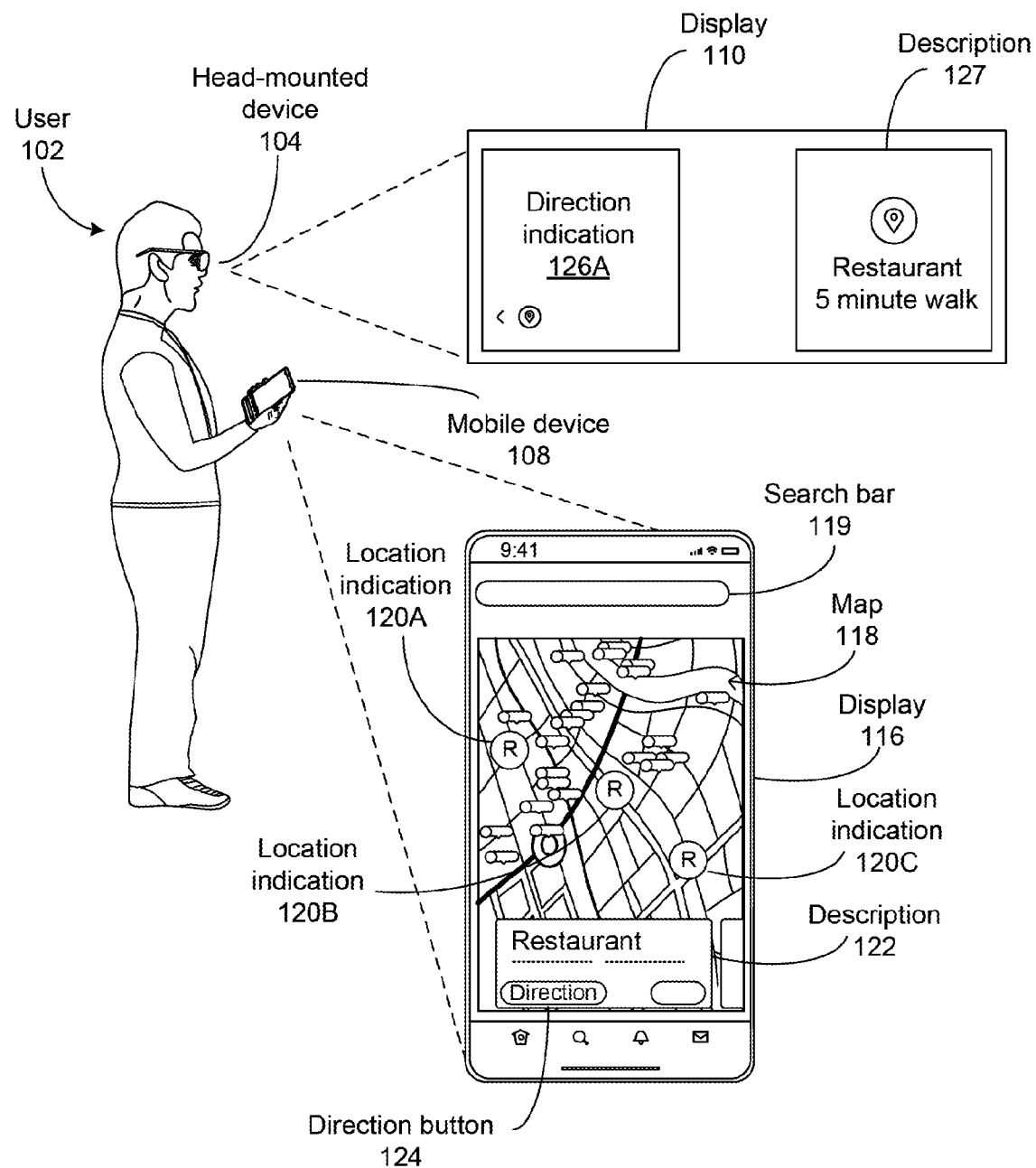
FIG. 1B shows the user looking away from the mobile device.

FIG. 1B shows the user 102 looking away from the mobile device 108. The user 102 can look away from the mobile device 108 by looking up away from the mobile device 108, by moving a head of the user 102 into an orientation in which persons typically walk, and/or by pointing eyes of the user 102 in a direction away from the mobile device 108. The user 102 has looked away from the mobile device 108 after requesting directions to the destination from the mobile device 108. In some examples, the user 102 requested turn-by-turn directions to navigate to the destination by selecting the direction button 124.

In response to the user 102 looking away from the mobile device 108, the mobile device 108 sends a direction instruction to the head-mounted device 104. The direction instruction instructs, causes, and/or prompts the head-mounted device 104 to present a direction indication 126A. The direction indication 126A can indicate a direction (such as left, right, or forward) for the user to travel to arrive at the selected destination. In the example shown in FIG. 1B, the direction indication 126A suggests the user 102 to turn to the left (left arrow) to arrive at the destination. The head-mounted device 104 presents the direction indication 126A on the display 110 based on the destination being outside the field of view of the user 102. The direction indication 126A can suggest the direction for the user 102 to walk based on the destination being outside a field of view of the user. The sending of the direction instruction to the head-mounted device 104 can implement a handoff of presenting turn-by-turn directions from the mobile device 108 to the head-mounted device 104.

Figure 1C:
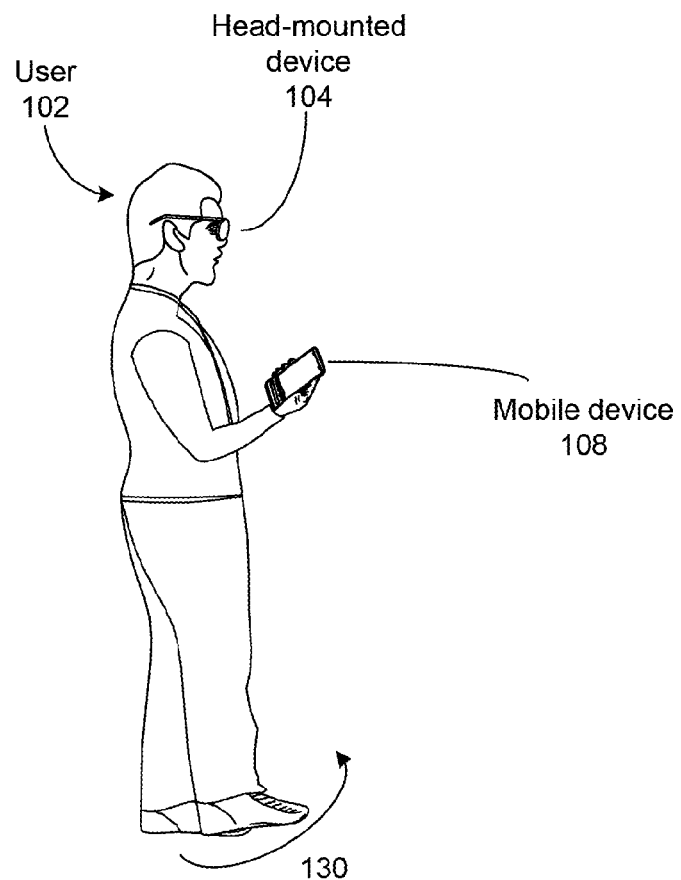
FIG. 1C shows the user turning to the left.

In some examples, in response to the user 102 looking away from the mobile device 108, the mobile device 108 can also send a description message to the head-mounted device 104. The description message can instruct, cause, and/or prompt the head-mounted device 104 to present a description (such as the description 127 shown in FIG. 1B) of the destination. The description 127 can include, for example, a name of the destination and/or a distance of the destination from a current location of the user 102 and/or mobile device 108. The distance can be presented in terms of either distance (such as feet or miles) or time (such as number of minutes walking). In some examples, the display 110 presents only one of the direction indication 126A and the description 127. In some examples, the display 110 presents the direction indication 126A until the user 102 responds to the direction indication 126A (such as by turning left as shown in FIG. 1C), and present the description 127 after the user 102 responds to the direction indication 126A.

In some examples, the mobile device 108 can determine that the user 102 has looked away from the mobile device 108 based on an orientation, movement, and/or acceleration of the head-mounted device 104. In some examples, the mobile device 108 can determine that the user 102 has looked away from the mobile device 108 based on the orientation satisfying a look-away orientation condition, such as with within a threshold angle (such as fifteen degrees (15°)) of parallel to the ground and/or within a threshold angle from the horizon. In some examples, the mobile device 108 can determine that the user 102 has looked away from the mobile device 108 based on movement of the head-mounted device 104 satisfying a look-away movement condition, such as the head-mounted device 104 moving at least a threshold distance away from the mobile device 108. In some examples, the mobile device 108 can determine that the user 102 has looked away from the mobile device 108 based on movement of the head-mounted device 104 satisfying a look-away acceleration condition, such as the head-mounted device 104 accelerating by at least a threshold acceleration value or moving at least a threshold speed away from the mobile device 108. In some examples, the mobile device 108 can determine that the user 102 has looked away from the mobile device 108 based on a combination of the orientation, movement, and/or acceleration of the head-mounted device 104. In some examples, the mobile device 108 can determine whether the user 102 has looked away from the mobile device 108 based on orientation values, movement values, and/or acceleration values received from the head-mounted device 104. In some examples, the mobile device 108 can determine whether the user 102 has looked away from the mobile device 108 after calculating orientation values, movement values, and/or acceleration values based on raw measurement data received from the head-mounted device 104. The orientation values, movement values, and/or acceleration values may be determined by means of sensors of the head-mounted device such as IMU sensors and/or magnetometers.

In some examples, the mobile device 108 can determine that the user 102 looked away from the mobile device 108 based on one or more images captured by the mobile device 108. The mobile device 108 can include a front-facing camera that captures images in the same direction that the display 116 displays images. The front-facing camera can capture images of the user 102. Based on the image(s) of the user 102 captured by the front-facing camera, the mobile device 108 can determine that the user 102 has looked away from (or has looked back toward or is still looking away from or toward) the mobile device 108.

In some examples, the mobile device 108 and/or head-mounted device 104 can determine whether the user 102 is looking at and/or has looked away from the mobile device 108 based on images captured by a gaze-tracking camera included in the head-mounted device 104. The gaze-tracking camera can capture images of the eyes of the user 102. Based on the images of the eyes of the user 102, the mobile device 108 and/or head-mounted device 104 can determine whether the user 102 has looked away from, is still looking at, has looked back toward, and/or is still looking away from, the mobile device 108.

In some examples, the mobile device 108 can determine that the user 102 has looked away from the mobile device 108 based on the display 116 turning off and/or being locked. In some examples, the mobile device 108 can determine that the user 102 has looked away from the mobile device 108 based on an application executing on the mobile device 108, such as a music application indicating that the user 102 is looking away from the mobile device 108 but a video or gaming application indicating that the user 102 is looking toward the mobile device 108.

FIG. 1C shows the user 102 turning to the left. In this example, the user 102 is turning to the left in accordance with the direction suggested by the direction indication 126A shown in FIG. 1B. While the user 102 in this example is turning to the left in accordance with the direction suggested by the direction indication 126A, in other examples, the user 102 could turn to the right or walk forward in accordance with a direction suggestion.

Figure 1D:
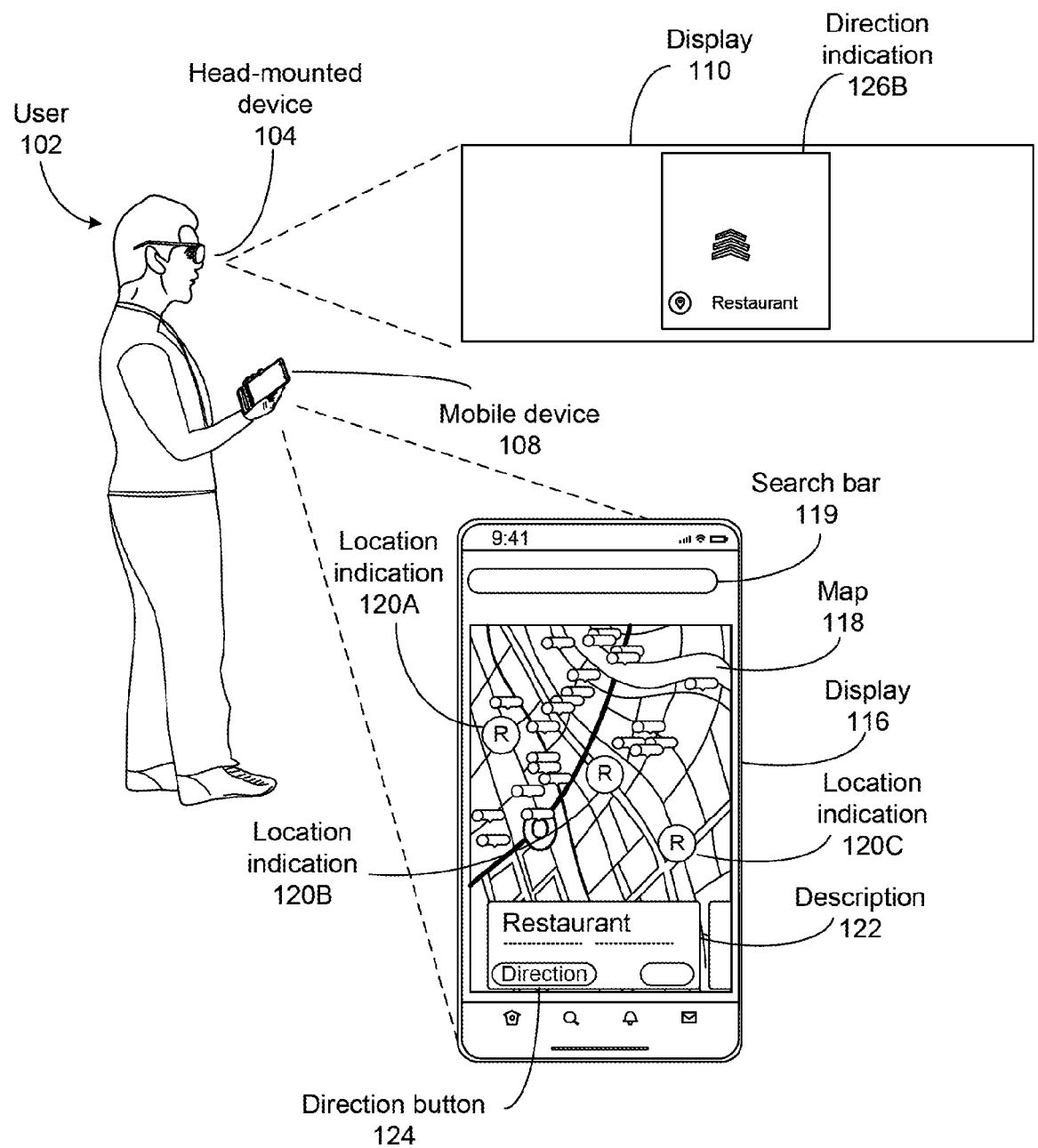
FIG. 1D shows the user walking forward.

FIG. 1D shows the user 102 walking forward. After turning to the left as shown in FIG. 1C, the user 102 is now walking forward. A direction indication 126B presented by the display 110 now suggests the user 102 to walk forward (as shown by the upward arrows) to arrive at, and/or navigate to, the destination. The direction indication 126B can suggest the direction for the user 102 to walk based on the destination being outside a field of view of the user.

Figure 1E:
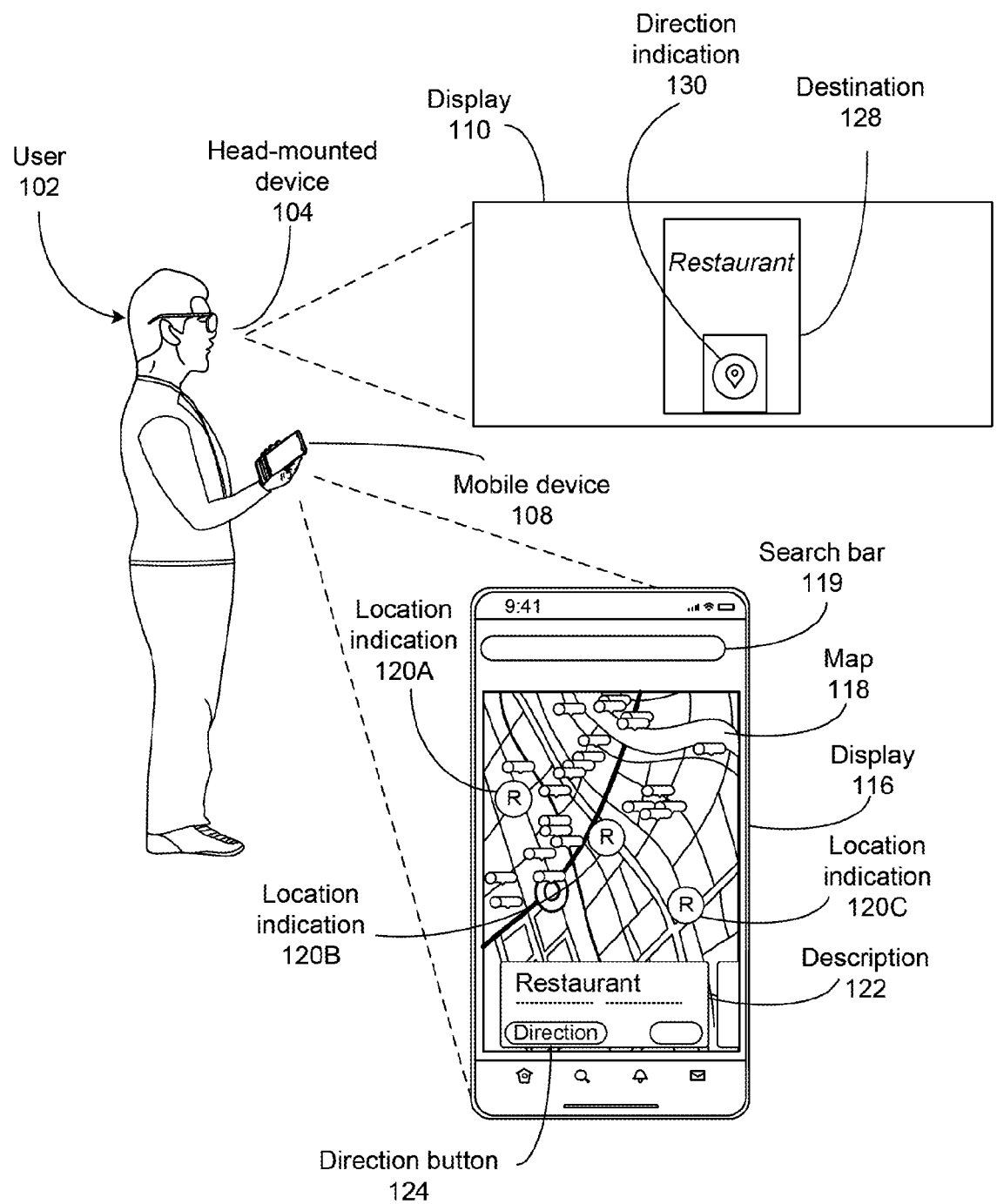
FIG. 1E shows the user viewing the destination through the head-mounted device.

FIG. 1E shows the user 102 viewing the destination 128 through the head-mounted device 104. In this example, the destination 128 is a restaurant. The destination 128 is within a field of view of the user 102. The user 102 can see the destination 128 through the lenses of the head-mounted device 104, which forms the display 110. In this example, the display 110 presents a translucent direction indication 130. The translucent direction indication 130 is superimposed over the destination 128, and/or is disposed between an eye of the user 102 and the destination 128. The translucent direction indication 130 indicates to the user 102 that the destination 128 is within the field of view of the user 102, and indicates the location of the destination 128. The head-mounted device 104 can present the translucent direction indication between an eye of the user 102 and the destination 128 based on the destination 128 being within the field of view of the user 102.

Figure 2:
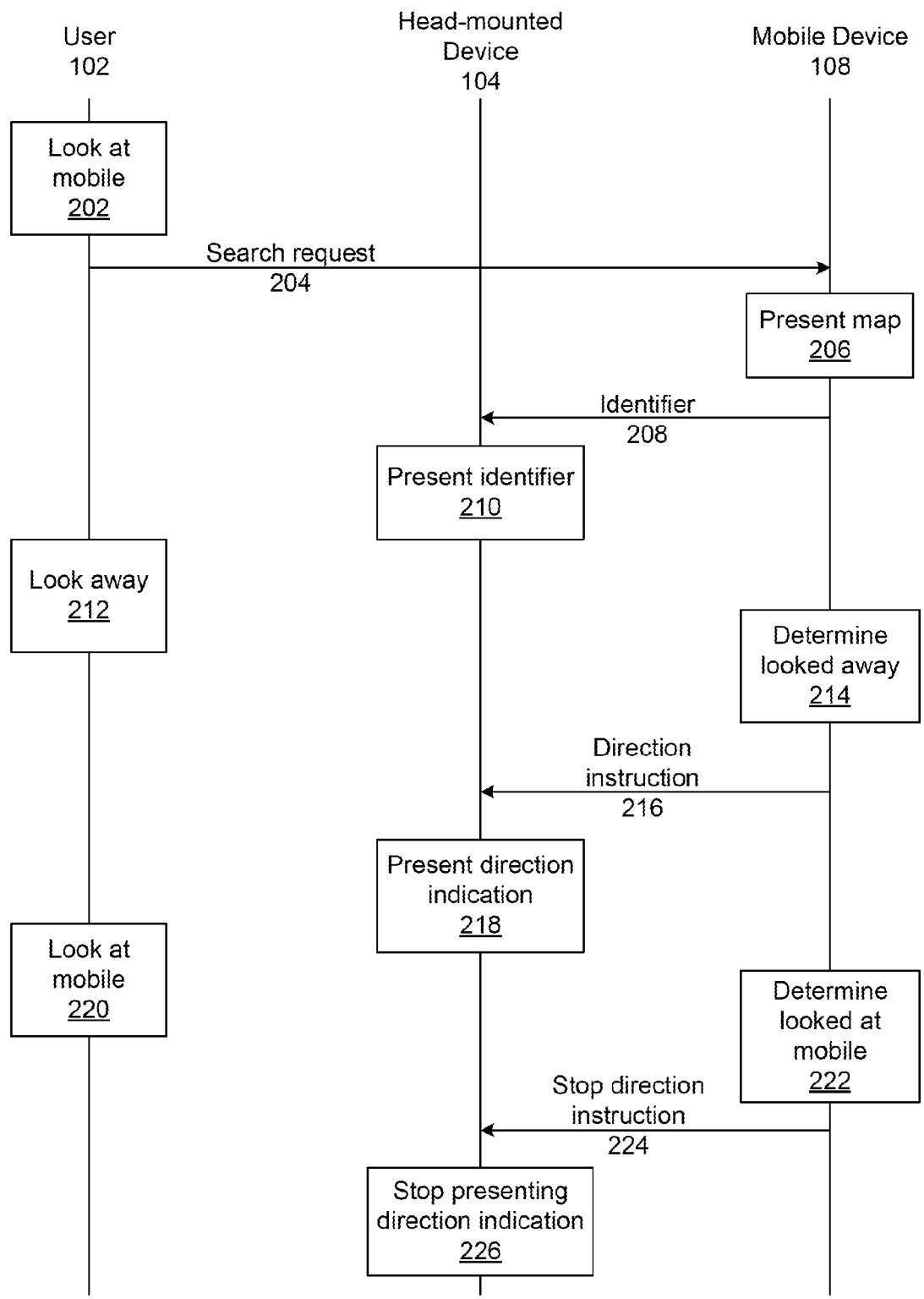
FIG. 2 is a timing diagram showing interactions between, and actions performed by, the user, the head-mounted device, and the mobile device.

FIG. 2 is a timing diagram showing interactions between, and actions performed by, the user 102, the head-mounted device 104, and the mobile device 108. The user 102 looks at the mobile device 108 (202). The user 102 can look at the mobile device 108 (202) by a combination of moving the mobile device 108 toward a head and/or face of the user 102, rotating the head of the user 102 down toward the mobile device 108, and/or rotating eyes of the user 102 toward the mobile device 108.

The user 102 can initiate launching of an application (such as a mapping application) and/or input a search request 204 to the mobile device 108. The user 102 can input the search request 204 by entering search terms into the search bar 119.

The mobile device 108 can respond to receiving the search request 204, and/or the request to launch the application (such as the mapping application) by presenting the map 118 (206). The mobile device 108 can present the map 118 on the display 116. The map 118 presented by the mobile device 108 can include location indications 120A, 120B, 120C of potential destinations corresponding to the search request 204.

After presenting the map 118 (206), the mobile device 108 sends an identifier message 208 to the head-mounted device 104. The head-mounted device 104 responds to receiving the identifier message 208 by presenting the identifier 114 (210). The identifier message 208 can include information included in the identifier 114, such as a name of the destination.

The user 102 looks away from the mobile device 108 (212). The mobile device 108 determines that the user 102 has looked away from the mobile device 108 (214). The mobile device 108 can determine that the user 102 looked away from the mobile device 108 (214) based, for example, on an orientation of the head-mounted device 104, movement of the head-mounted device 104, acceleration of the head-mounted device 104, an image of the eye(s) of the user 102 captured by the head-mounted device 104, and/or an image of the user 102 (or an image that does not include the user 102) captured by the mobile device 108, or any combination thereof, as non-limiting examples.

In response to determining that the user 102 has looked away from the mobile device 108 (214), the mobile device 108 sends a direction instruction 216 to the head-mounted device 104. The head-mounted device 104 responds to receiving the direction instruction 216 by presenting the direction indication 126A, 126B, 130 (218). The direction indication 126A, 126B, 130 indicates to the user 102 a direction that the user 102 should walk to arrive at and/or navigate to the destination 128.

At some point while the head-mounted device 104 is presenting the direction indication 126A, 126B, 130 (218), the user 102 can look at the mobile device 108 (220) again. The user 102 can look at the mobile device 108 (220) again to select a different destination, to respond to a text message, or to look up unrelated information, as non-limiting examples.

The mobile device 108 can determine that the user 102 looked at the mobile device 108 (222). The mobile device 108 can determine that the user 102 looked back toward the mobile device 108 (222) based, for example, on an orientation of the head-mounted device 104, movement of the head-mounted device 104, acceleration of the head-mounted device 104, an image of the eye(s) of the user 102 captured by the head-mounted device 104, and/or an image of the user 102 (or an image that does not include the user 102) captured by the mobile device 108, or any combination thereof, as non-limiting examples.

Based on determining that the user 102 looked at the mobile device 108 (222), the mobile device 108 can send a stop direction instruction 224 to the head-mounted device 104. The head-mounted device 104 can respond to receiving the stop direction instruction 224 by stopping and/or ceasing presentation of the direction indication 126A, 126B, 130 (226). The stopping and/or ceasing presentation of the direction indication 126A, 126B, 130 (226) can remove a distraction while the user 102 is interacting directly with the mobile device 108.

Figure 3:
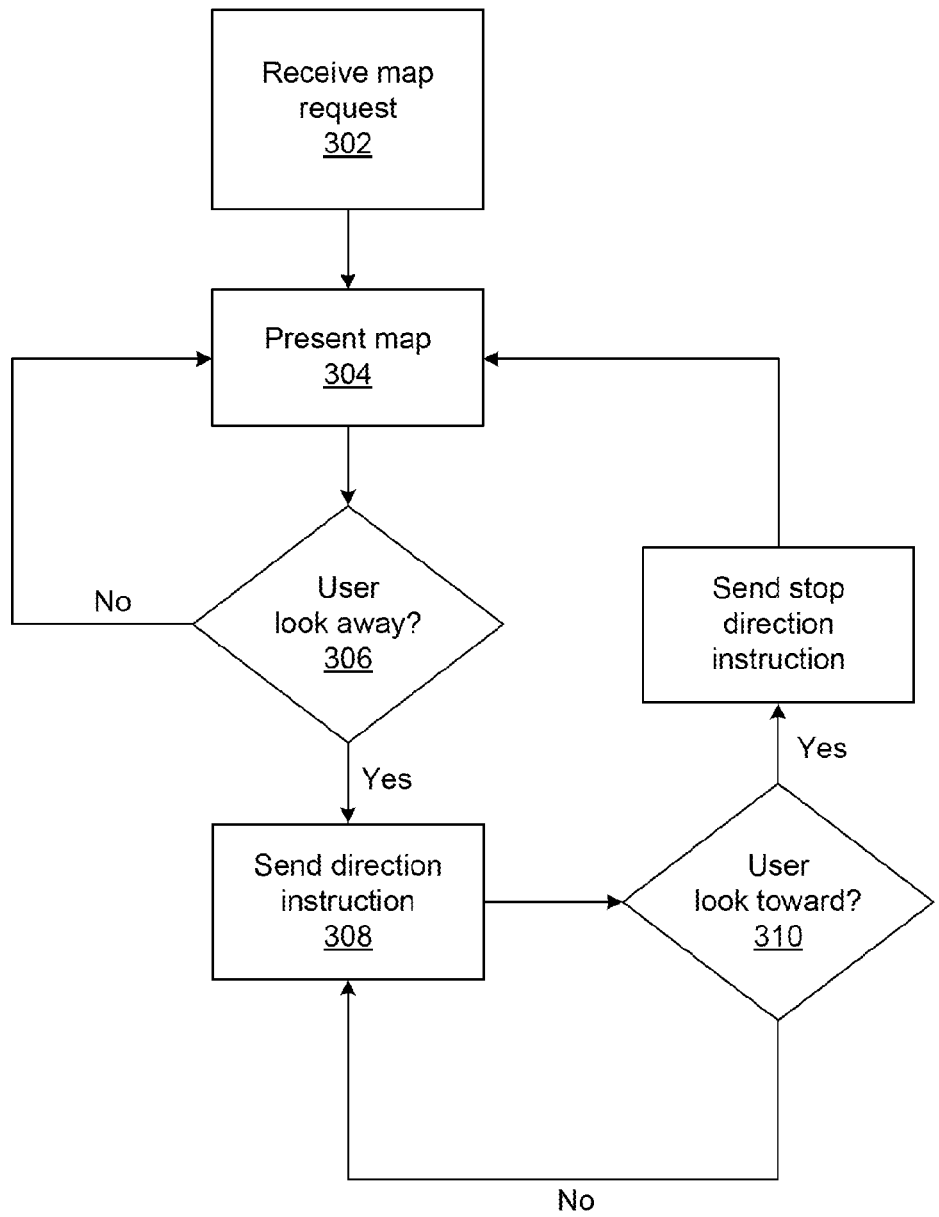
FIG. 3 is a flowchart showing functions performed by the mobile device.

FIG. 3 is a flowchart showing functions performed by the mobile device 108. The mobile device 108 can receive a map request (302). The map request can include a request and/or initiation of launching a mapping application, and/or can include receiving a search request 204 that requests locations of a type of destination (such as a restaurant). The map request can be received from the user 102 via a human interface device (HID) such as a touchscreen.

The mobile device 108 can respond to receiving the map request (302) by presenting the map 118 (304). The mobile device 108 can present the map 118 (304) via and/or on the display 116. The presentation of the map 118 (304) can include presenting potential destinations as location indications 120A, 120B, 120C. The mobile device 108 may have determined the potential destinations based on terms included in the search request 204 and a location of the user 102 and/or mobile device 108, and/or by sending the terms included in the search request 204 and the location of the user 102 and/or mobile device 108 to a remote server and received the potential destinations from the remote server.

The mobile device 108 determines whether the user 102 has looked away from the mobile device 108 (306). The user 102 looking away from the mobile device 108 can be considered an indication that the user 102 is walking, or about to start walking, toward the destination 128. The mobile device 108 can determine that the user 102 has looked away from the mobile device 108 based on an orientation of the head-mounted device 104 toward a direction parallel to the ground and/or away from a direction normal to the ground, based on movement and/or acceleration of the head-mounted device 104 away from the mobile device 108, based on one or multiple images captured by a camera included in the mobile device 108 (the images can show the movement and/or change of orientation of the head-mounted device 104 away from the mobile device 108), based on one or multiple images captured by a gaze-tracking camera included in the head-mounted device 104 (the images captured by the gaze-tracking camera can show eyes of the user 102 looking away from the mobile device 108), accelerometer and/or location measurements performed by the head-mounted device 104 and/or mobile device 108 indicating that the user 102 is walking, or any combination of one or multiple of such signals. In some examples, the mobile device 108 can determine whether the user 102 has looked away from the mobile device 108 based on a probability model that has been trained to determine a likelihood that the user 102 has looked away from the mobile device 108 based on a combination of these signals and/or measurements. The mobile device 108 can determine whether the user 102 has looked away from the mobile device 108 based on the probability model determining that there is at least a predetermined likelihood (such as 60%, 70%, 80%, or 90%, as non-limiting examples) that the user 102 has looked away from the mobile device 108.

If the mobile device 108 determines that the user 102 has not looked away from the mobile device 108, then the mobile device 108 can continue presenting the map 118 (304).

If the mobile device 108 determines that the user 102 has looked away from the mobile device 108, then the mobile device 108 sends a direction instruction 216 (308) to the head-mounted device 104. The direction instruction 216 prompts the head-mounted device 104 to present a direction indication 126A, 126B, 130 (218). The direction indication 126A, 126B, 130 can indicate a direction that the user 102 should travel, walk, and/or turn (such as left, right, or forward) to arrive at the destination, taking into account typical travel paths (such as sidewalks) and obstructions or locations to avoid (such as buildings, bodies of water, or dangerous streets).

After sending a direction instruction 216 (308) to the head-mounted device 104, the mobile device 108 can determine whether the user 102 has looked back toward the mobile device 108 (310). The mobile device 108 can determine whether the user 102 has looked back toward the mobile device 108 (310) based on similar, but opposite signals and/or measurements as determining whether the user 102 has looked away from the mobile device 108 (306). The mobile device 108 can determine that the user 102 has looked back toward the mobile device 108 based on an orientation of the head-mounted device 104 being below a direction parallel to the ground and/or toward a direction normal to the ground, based on movement and/or acceleration of the head-mounted device 104 toward the mobile device 108, based on one or multiple images captured by a camera included in the mobile device 108 (the images can show the movement and/or change of orientation of the head-mounted device 104 toward the mobile device 108), based on one or multiple images captured by a gaze-tracking camera included in the head-mounted device 104 (the images captured by the gaze-tracking camera can show eyes of the user 102 looking toward the mobile device 108), accelerometer and/or location measurements performed by the head-mounted device 104 and/or mobile device 108 indicating that the user 102 is standing still, or any combination of one or multiple of such signals. In some examples, the mobile device 108 can determine whether the user 102 has looked back toward the mobile device 108 based on a probability model that has been trained to determine a likelihood that the user 102 has looked toward the mobile device 108 based on a combination of these signals and/or measurements. The mobile device 108 can determine whether the user 102 has looked toward the mobile device 108 based on the probability model determining that there is a predetermined likelihood (such as 60%, 70%, 80%, or 90%, as non-limiting examples) that the user 102 has looked toward the mobile device 108. By requiring the predetermined likelihood that the user 102 has looked away from the mobile device 108 to be significantly greater than 50% and the predetermined likelihood that the user 102 has looked toward the mobile device 108 to be significantly greater than 50%, the mobile device 108 can create a hysteresis loop in which the determined status of the user 102 looking at or away from the mobile device 108 does not change unless there is a high probability that the status of looking away or toward has changed (i.e. if whether the user 102 is looking toward or away from the mobile device 108 is unclear then the status of the user 102 looking toward or away from the mobile device 108 will not change).

If the mobile device 108 determines that the user 102 has not looked back toward the mobile device 108, then the mobile device 108 can continue sending direction instructions 216 to the head-mounted device 104 (308). The direction instructions 216 can be different from previous direction instructions 216 as the location of the user 102 changes—the direction instruction 216 at one location can suggest a turn in a particular direction, whereas the direction instruction 216 at another location can suggest walking forward or turning in a different direction.

If the mobile device 108 determines that the user 102 has looked back toward the mobile device 108, then the mobile device 108 can either stop sending direction instructions 216 to the head-mounted device 104, or can send a stop direction instruction 224 to the head-mounted device 104 (312). The stop direction instruction 224 can cause the head-mounted device 104 to stop presenting the direction indication 126A, 126B, 130 (226).

Figure 4:
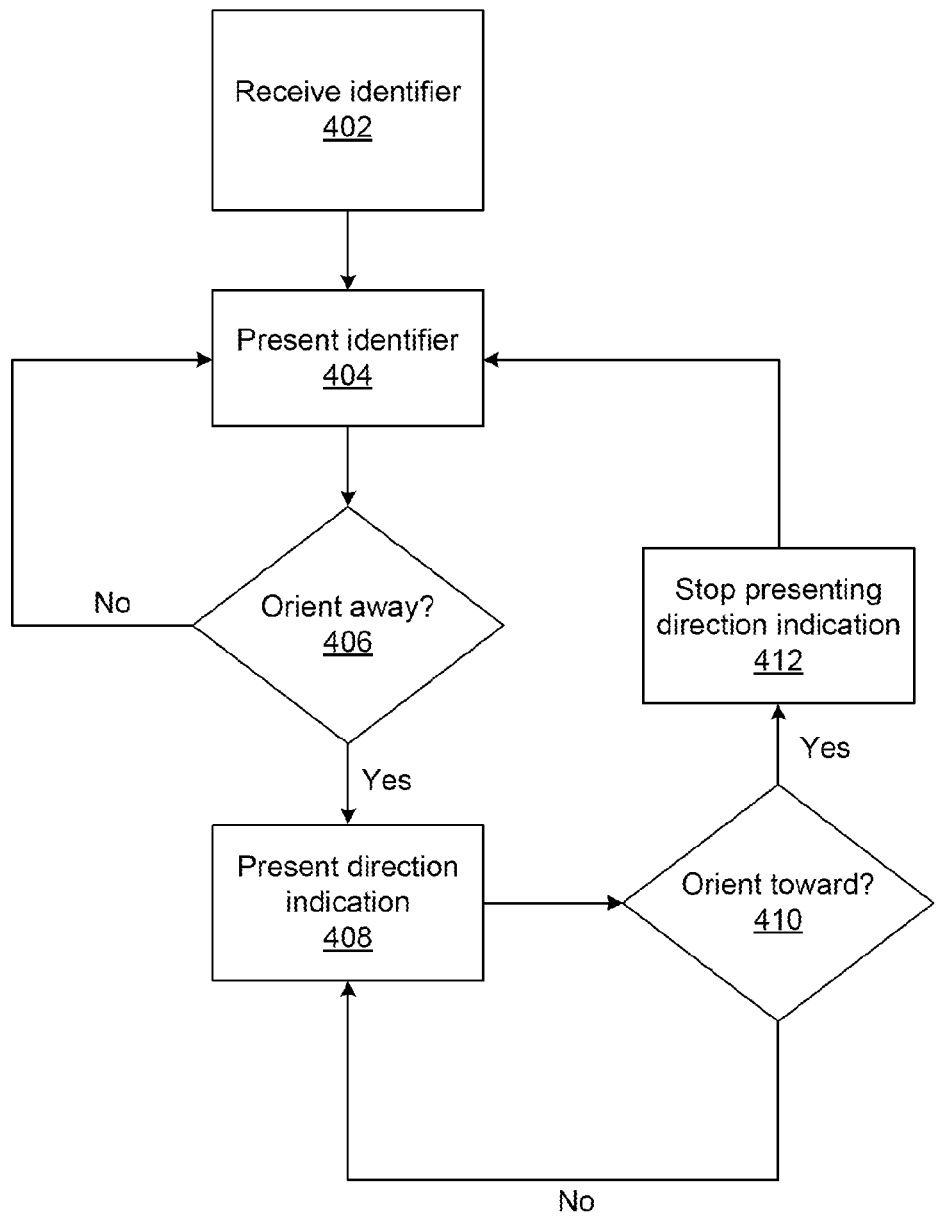
FIG. 4 is a flowchart showing functions performed by the head-mounted device.

FIG. 4 is a flowchart showing functions performed by the head-mounted device 104. The head-mounted device 104 can receive an identifier message 208 from the mobile device 108 (402). The identifier message 208 can include information about a destination selected by the user 102.

The head-mounted device 104 can respond to receiving the identifier message 208 by presenting an identifier 114 (404). The identifier 114 can include information about the destination, such as a name of the destination (such as a name of a restaurant).

In some examples, the head-mounted device 104 determines whether the user 102 oriented away from the mobile device 108 (406). In some examples, the head-mounted device 104 can determine whether the user 102 oriented away from the mobile device 108 (406) based on receiving a signal and/or message from the mobile device 108, such as a direction instruction 216. In some examples, the head-mounted device 104 can determine whether the user 102 oriented away from the mobile device 108 (406) based on a determined orientation of the head-mounted device 104 (which can be determined based on measurements performed by an inertial measurement unit (IMU) and/or magnetometer), based on images captured by one or more gaze-tracking cameras included in the head-mounted device 104 indicating that the eye(s) of the user 102 is looking away from the mobile device 108, IMU and/or accelerometer measurements indicating that the user 102 is walking, or any combination thereof.

If the head-mounted device 104 determines that the user 102 has not oriented away from the head-mounted device 104, then the head-mounted device 104 can continue presenting the identifier 114 (404).

If the head-mounted device 104 determines that the user 102 has oriented away from the head-mounted device 104, then the head-mounted device 104 presents a direction indication 126A, 126B, 130 (408). The head-mounted device 104 can present the direction indication 126A, 126B, 130 (408) in response to, and/or based on, a direction instruction 216 received from the mobile device 108. The head-mounted device 104 can present the direction indication 126A, 126B, 130 (408) on one or both lenses of the head-mounted device 104. The direction indication 126A, 126B, 130 can indicate a direction that the user 102 should travel to arrive at the destination.

While the head-mounted device 104 is presenting the direction indication 126A, 126B, 130 (408), the head-mounted device 104 can determine whether the head-mounted device 104 has oriented back toward the mobile device 108 (410). In some examples, the head-mounted device 104 can determine whether the head-mounted device 104 has oriented back toward the mobile device 108 (410) based on whether the head-mounted device 104 receives a stop direction instruction 224 from the mobile device 108. If the head-mounted device 104 does not receive a stop direction instruction 224 from the mobile device 108, then the head-mounted device 104 can determine that the head-mounted device 104 did not orient back toward the mobile device 108. If the head-mounted device 104 does receive a stop direction instruction 224 from the mobile device 108, then the head-mounted device 104 can determine that the head-mounted device 104 did orient back toward the mobile device 108.

In some examples, the head-mounted device 104 can determine whether the head-mounted device 104 has oriented back toward the mobile device 108 (410) based on similar but opposite criteria as determining whether the head-mounted device 104 oriented away from the mobile device 108. In some examples, the head-mounted device 104 can determine whether the user 102 oriented back toward the mobile device 108 (406) based on a determined orientation of the head-mounted device 104 (which can be determined based on measurements performed by an inertial measurement unit (IMU) and/or magnetometer), based on images captured by one or more gaze-tracking cameras included in the head-mounted device 104 indicating that the eye(s) of the user 102 is looking toward the mobile device 108, IMU and/or accelerometer measurements indicating that the user 102 stopped walking, or any combination thereof.

If the head-mounted device 104 determines that the head-mounted device 104 has not oriented back toward the mobile device 108, then the head-mounted device 104 can continue presenting direction indications 126A, 126B, 130. The direction indications 126A, 126B, 130 can change while the user 102 is traveling, reflecting updated turn-by-turn directions.

If the head-mounted device 104 determines that the head-mounted device 104 has oriented back toward the mobile device 108, then the head-mounted device 104 can stop presenting the direction indications 126A, 126B, 130 (412). The ceasing and/or termination of presenting the direction indications 126A, 126B, 130 (412) can remove and/or eliminate a potential distraction from the user 102 while the user 102 is looking at the mobile device 108. If the user 102 has not arrived at the destination, the head-mounted device 104 can continue presenting the identifier 114 (404).

Figure 5A:
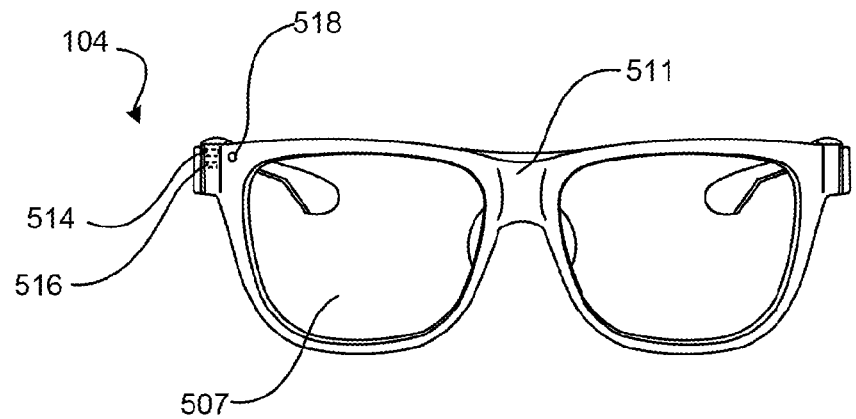
FIGS. 5A, 5B, and 5C show an example of the head-mounted device.
Figure 5B:
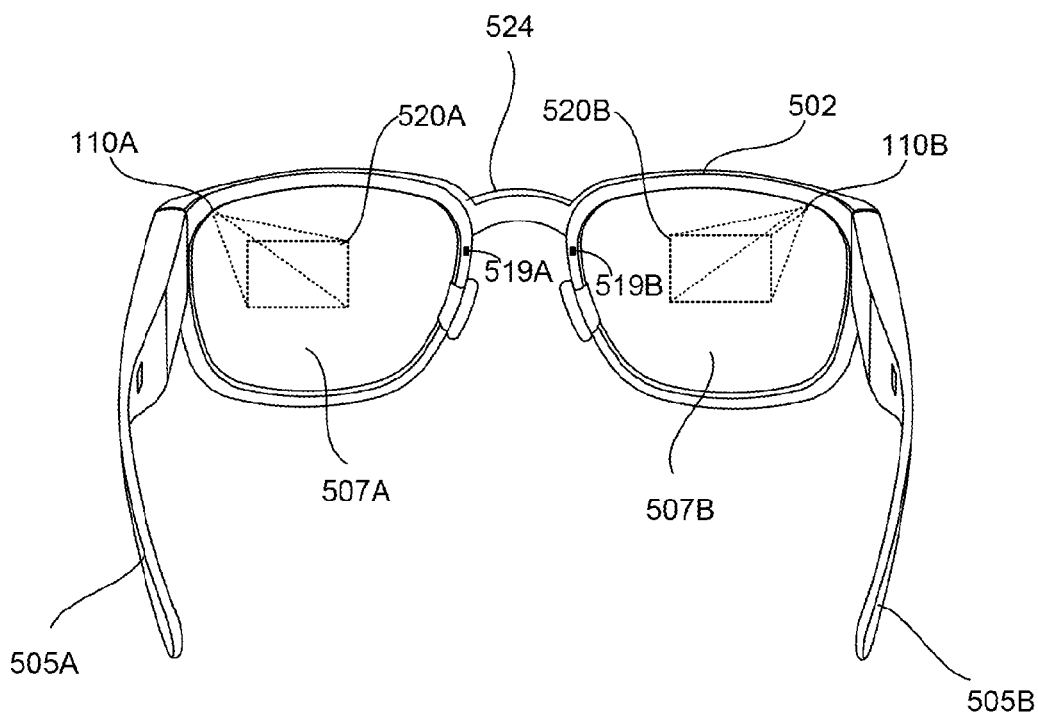
Figure 5C:
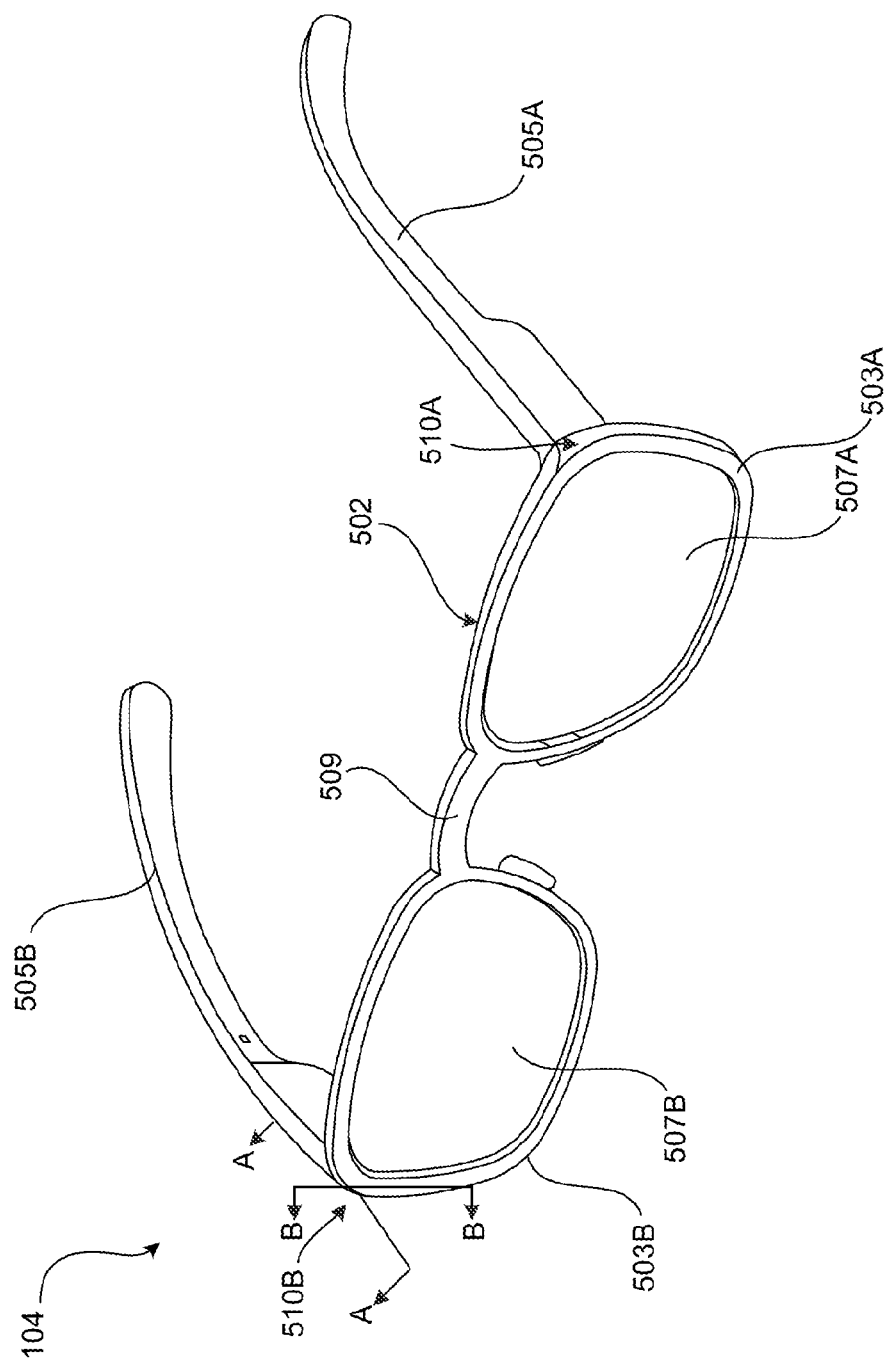

FIGS. 5A, 5B, and 5C show an example of the head-mounted device 104. As shown in FIGS. 5A, 5B, and 5C, the example head-mounted device 104 includes a frame 502. The frame 502 includes a front frame portion defined by rim portions 503A, 503B surrounding respective optical portions in the form of lenses 507A, 507B, with a bridge portion 509 connecting the rim portions 503A, 503B. Arm portions 505A, 505B are coupled, for example, pivotably or rotatably coupled, to the front frame by hinge portions 510A, 510B at the respective rim portion 503A, 503B. In some examples, the lenses 507A, 507B may be corrective/prescription lenses. In some examples, the lenses 507A, 507B may be an optical material including glass and/or plastic portions that do not necessarily incorporate corrective/prescription parameters. Displays 110A, 110B (which can be components of the display 110 shown in FIGS. 1A, 1B, 1D, and 1E) may be coupled in a portion of the frame 502. In the example shown in FIG. 5B, the displays 110A, 110B are coupled in the arm portions 505A, 505B and/or rim portions 503A, 503B of the frame 502. In some examples, the head-mounted device 104 can also include an audio output device 516 (such as, for example, one or more speakers), an illumination device 518, at least one processor 511, an outward-facing image sensor 514 (or camera), and gaze-tracking cameras 519A, 519B that can capture images of eyes of the user 102 to track a gaze of the user 102. In some examples, the head-mounted device 104 may include a see-through near-eye display. For example, the displays 110A, 110B may be configured to project light from a display source onto a portion of teleprompter glass functioning as a beamsplitter seated at an angle (e.g., 30-45 degrees). The beamsplitter may allow for reflection and transmission values that allow the light from the display source to be partially reflected while the remaining light is transmitted through. Such an optic design may allow a user to see both physical items in the world, for example, through the lenses 507A, 507B, next to content (for example, digital images, user interface elements, virtual content, and the like) generated by the displays 110A, 110B. In some implementations, waveguide optics may be used to depict content on the displays 110A, 110B via outcoupled light 420A, 420B. The images projected by the displays 110A, 110B onto the lenses 507A, 507B may be translucent, allowing the user 102 to see the images projected by the displays 110A, 110B as well as physical objects beyond the head-mounted device 104.

Figure 6:
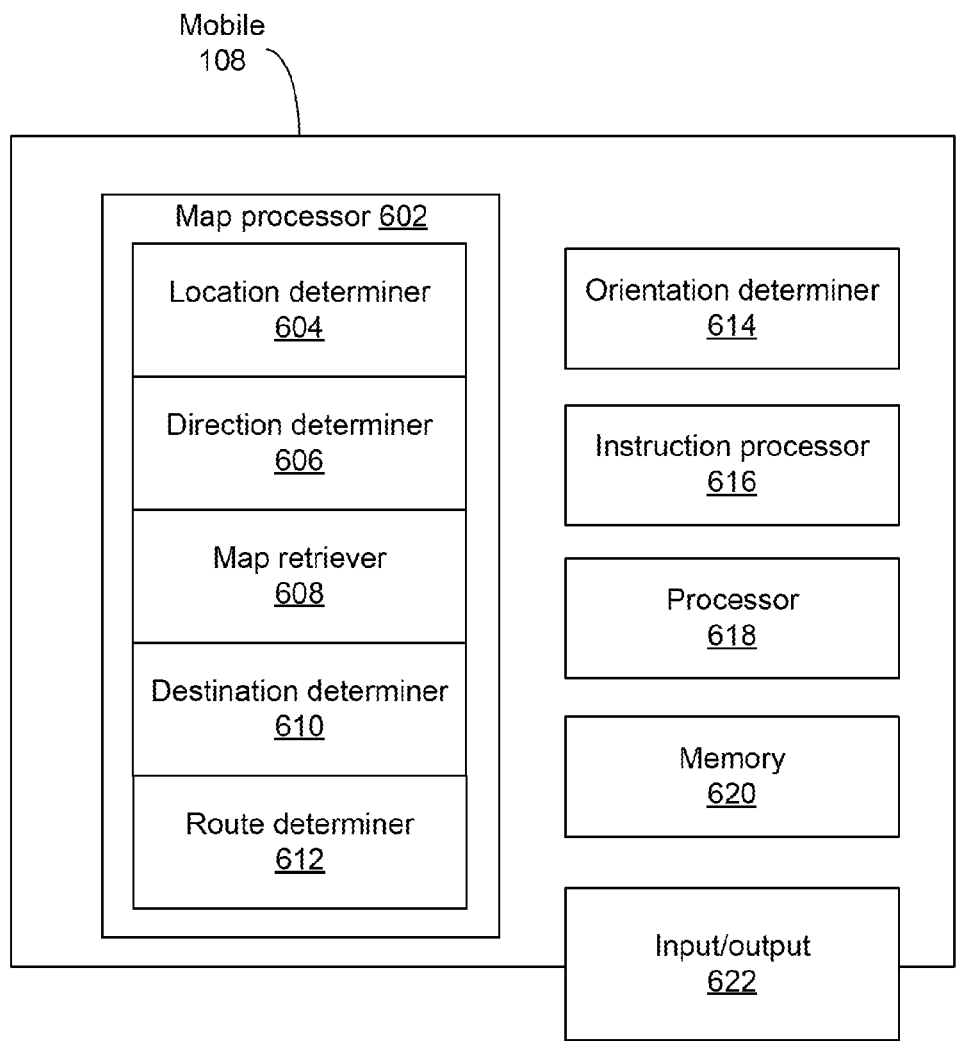
FIG. 6 is a block diagram of the mobile device.

FIG. 6 is a block diagram of the mobile device 108. The mobile device 108 can include a map processor 602. Functions described with respect to the map processor 602 can be performed by the mobile device 108 individually, by a remote server in communication with the mobile device 108, and/or by a combination of the mobile device 108 and the remote server in communication with the mobile device 108.

The map processor 602 can include a location determiner 604. The location determiner 604 can determine a location of the mobile device 108 and, by inference, the user 102. The location determiner 604 can determine the location of the location determiner 604 based on global positioning system (GPS) signals, signals from one or more base stations in communication with the mobile device 108, based on signals from Institute for Electrical and Electronics Engineers (IEEE) 802.11 access points in communication with the mobile device 108, and/or based on signals received from other mobile devices, as non-limiting examples.

The map processor 602 can include a direction determiner 606. The direction determiner 606 can determine a direction that the user 102 is facing. The mobile device 108 and/or head-mounted device 104 can provide turn-by-turn directions based in part on the determined direction that the user 102 is facing. The direction determiner 606 can determine the direction that the user 102 is facing based, for example, on previous movements and/or locations of the user 102, images of the user 102 captured by the mobile device 108 and/or head-mounted device 104, and/or an orientation of the mobile device 108 and/or head-mounted device 104.

The map processor 602 can include a map retriever 608. The map retriever 608 can retrieve a map to present on the display 110. An example of the retrieved and presented map is the map indication 112. The map retriever 608 can retrieve the map from, for example, a remote server in communication with the mobile device 108.

The map processor 602 can include a destination determiner 610. The destination determiner 610 can determine a destination for the user 102 to travel to (such as by walking). The destination determiner 610 can determine the destination based on a selection by the user 102, such as the potential destination presented in the description 122 when the user 102 selects the direction button 124. In some examples, the mobile device 108 can send the selected and/or determined destination to the remote server that is in communication with the mobile device 108.

The map processor 602 can include a route determiner 612. The route determiner 612 can determine a route for the user 102 to travel (such as by walking) from the current location of the user 102 to the destination. In some examples, the route determiner 612 can determine the route by performing route calculations locally on the mobile device 108. In some examples, the route determiner 612 can determine the route by sending a request to a remote server in communication with the mobile device 108 (the request can include the current location of the user 102 and the location of the destination), and receiving turn-by-turn directions from the remote server. The route determiner 612 can update the route when the current location of the user 102 changes.

The mobile device 108 can include an orientation determiner 614. The orientation determiner 614 can determine an orientation of the user 102, including whether the user 102 has looked away from the mobile device 108 and/or whether the user 102 has looked toward the mobile device 108. The orientation determiner 614 can determine whether the user 102 has looked away from or toward the mobile device 108 based on an orientation of the head-mounted device 104, based on movement and/or acceleration of the head-mounted device 104, based on one or multiple images captured by a camera included in the mobile device 108, based on one or multiple images captured by a gaze-tracking camera included in the head-mounted device 104, accelerometer and/or location measurements performed by the head-mounted device 104 and/or mobile device 108 indicating that the user 102, or any combination of one or multiple of such signals.

The mobile device 108 can include an instruction processor 616. The instruction processor 616 can generate and send instructions to the head-mounted device 104. The instruction processor 616 can, for example, generate and send an identifier message 208 to the head-mounted device 104 in response to receiving a search request 204 from the head-mounted device 104. The instruction processor 616 can, for example, send a direction instruction 216 to the head-mounted device 104 in response to the orientation determiner 614 determining that the user 102 looked away from the mobile device 108. The instruction processor 616 can continue generating and sending direction instructions 216 to the head-mounted device 104 to update turn-by-turn directions based on the location of the user 102 changing while the user 102 is still looking away from the mobile device 108. The instruction processor 616 can generate and send a stop direction instruction 224 to the head-mounted device 104 in response to the orientation determiner 614 determining that the user 102 has looked back toward the mobile device 108.

The mobile device 108 can include at least one processor 618. The at least one processor 618 can execute instructions, such as instructions stored in at least one memory device 620, to cause the mobile device 108 to perform any combination of methods, functions, and/or techniques described herein.

The mobile device 108 can include at least one memory device 620. The at least one memory device 620 can include a non-transitory computer-readable storage medium. The at least one memory device 620 can store data and instructions thereon that, when executed by at least one processor, such as the processor 618, are configured to cause the mobile device 108 to perform any combination of methods, functions, and/or techniques described herein. Accordingly, in any of the implementations described herein (even if not explicitly noted in connection with a particular implementation), software (e.g., processing modules, stored instructions) and/or hardware (e.g., processor, memory devices, etc.) associated with, or included in, the mobile device 108 can be configured to perform, alone, or in combination with the mobile device 108, any combination of methods, functions, and/or techniques described herein.

The mobile device 108 may include at least one input/output node 622. The at least one input/output node 622 may receive and/or send data, such as from and/or to, a server, and/or may receive input and provide output from and to a user. The input and output functions may be combined into a single node, or may be divided into separate input and output nodes. The input/output node 622 can include, for example, a microphone, a camera (such as a front-facing camera), an IMU, a display (such as the display 116), a speaker, a microphone, one or more buttons, and/or one or more wired or wireless interfaces for communicating with other computing devices such as the head-mounted device 104 and/or a remote server.

Figure 7:
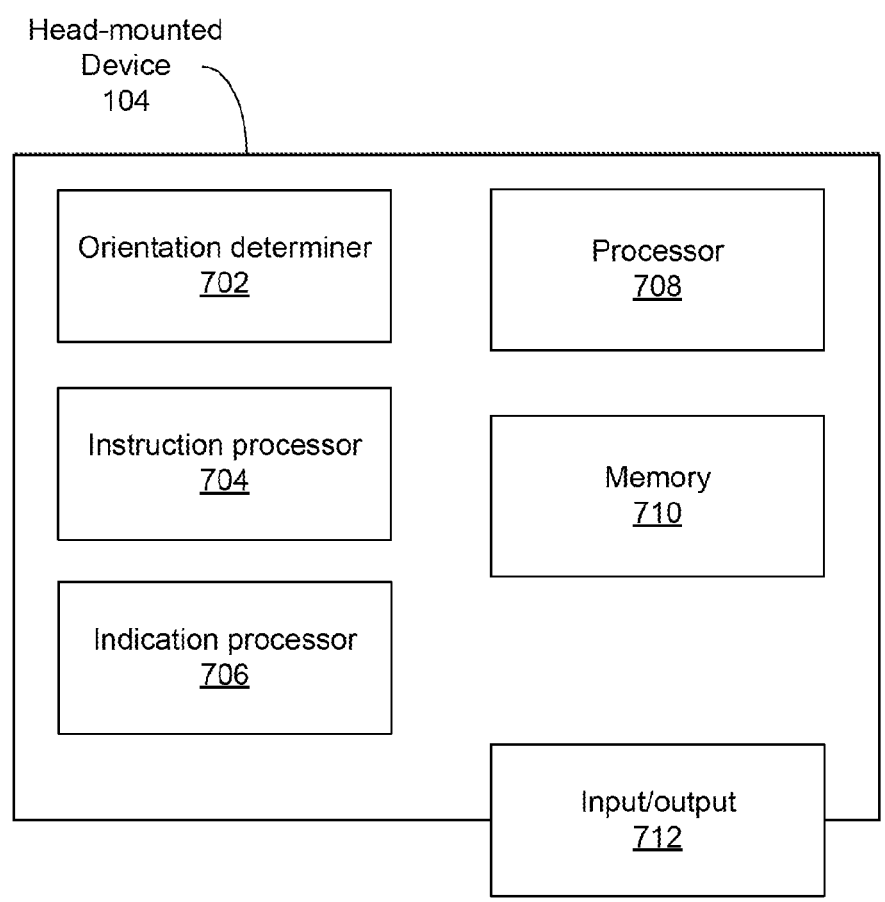
FIG. 7 is a block diagram of the head-mounted device.

FIG. 7 is a block diagram of the head-mounted device 104. The head-mounted device 104 can include an orientation determiner 702. The orientation determiner 702 can determine an orientation of the head-mounted device 104, and/or whether the user 102 is oriented toward or away from the mobile device 108. The orientation determiner 702 can determine the orientation, and/or whether the user 102 is oriented toward or away from the mobile device 108, based on a direction instruction 216 or stop direction instruction 224 received from the mobile device 108, a determined orientation of the head-mounted device 104, based on images captured by one or more gaze-tracking cameras 519A, 519B included in the head-mounted device 104, IMU and/or accelerometer measurements, or any combination thereof.

The head-mounted device 104 can include an instruction processor 704. The instruction processor 704 can process instructions received from the mobile device 108, such as the direction instruction 216 and/or stop direction instruction 224. The instruction processor 704 can cause the head-mounted device 104 to respond to the instructions by initiating responses to the instructions.

The head-mounted device 104 can include an indication processor 706. The indication processor 706 can cause the head-mounted device 104 to present indications, such as map indication 112, direction indications 126A, 126B, 130, and/or identifiers 114 and/or descriptions 127, in response to instructions processed by the instruction processor 704.

The head-mounted device 104 can include at least one processor 708. The at least one processor 708 can execute instructions, such as instructions stored in at least one memory device 710, to cause the head-mounted device 104 to perform any combination of methods, functions, and/or techniques described herein.

The head-mounted device 104 can include at least one memory device 710. The at least one memory device 710 can include a non-transitory computer-readable storage medium. The at least one memory device 710 can store data and instructions thereon that, when executed by at least one processor, such as the processor 708, are configured to cause the head-mounted device 104 to perform any combination of methods, functions, and/or techniques described herein. Accordingly, in any of the implementations described herein (even if not explicitly noted in connection with a particular implementation), software (e.g., processing modules, stored instructions) and/or hardware (e.g., processor, memory devices, etc.) associated with, or included in, the head-mounted device 104 can be configured to perform, alone, or in combination with the head-mounted device 104, any combination of methods, functions, and/or techniques described herein.

The head-mounted device 104 may include at least one input/output node 712. The at least one input/output node 712 may receive and/or send data, such as from and/or to, a server, and/or may receive input and provide output from and to a user. The input and output functions may be combined into a single node, or may be divided into separate input and output nodes. The input/output node 712 can include, for example, a microphone, one or more cameras (such as the outward-facing image sensor 514 and/or gaze-tracking camera(s) 519A, 519B), an IMU, a display (such as the display 110 and/or displays 110A, 110B), a speaker, a microphone, one or more buttons, and/or one or more wired or wireless interfaces for communicating with other computing devices such as the mobile device 108.

Figure 8:
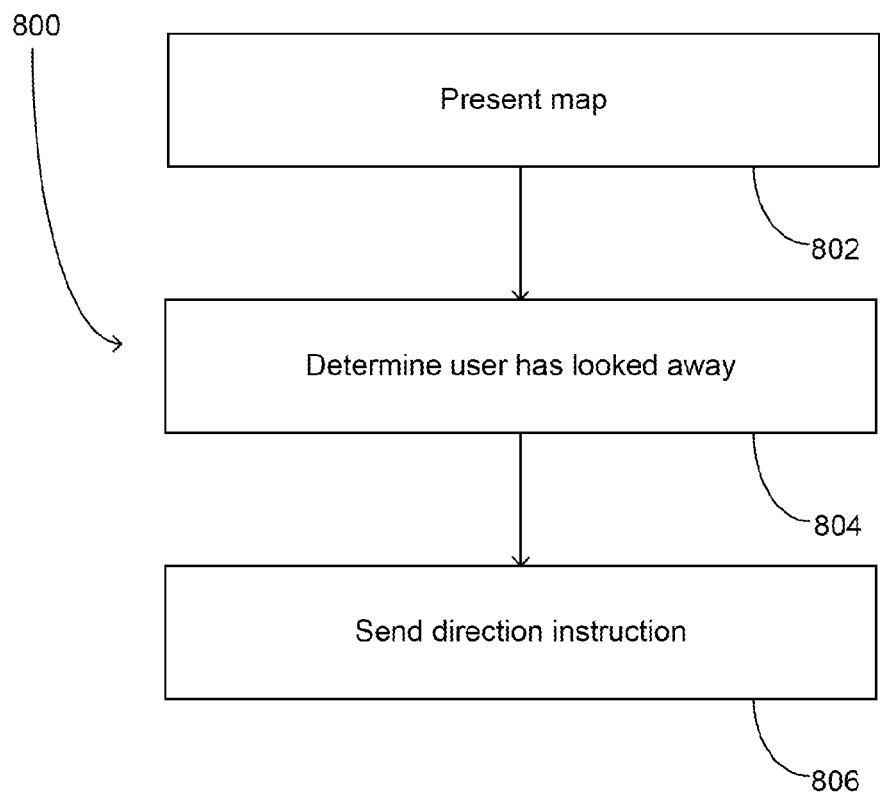
FIG. 8 is a flowchart showing a method performed by the mobile device.

FIG. 8 is a flowchart showing a method 800 performed by the mobile device 108. The method 800 includes presenting a map 118 (802). The map 118 a location indication 120A, 120B, 120C. The location indication 120A, 120B, 120C indicates a location of a destination. The method 800 includes determining that a user 102 has looked away from the mobile device 108 (804). The method 800 includes, in response to determining that the user 102 has looked away from the mobile device 108, sending a direction instruction 216 to a head-mounted device 104 (806). The direction instruction 216 instructs the head-mounted device 104 to present a direction indication 126A, 126B, 130. The direction indication 126A, 126B, 130 indicates a direction for the user 102 to travel to arrive at the destination 128. The head-mounted device 104 mounted on a head of the user 102.

In some examples, the destination is outside a field of view of the user, and the direction indication includes a directional indicator.

In some examples, the destination is within a field of view of the user, and the direction indication is translucent and is disposed between an eye of the user and the destination.

In some examples, determining that the user has looked away from the mobile device includes determining that the user has looked away from the mobile device based on an orientation of the head-mounted device.

In some examples, determining that the user has looked away from the mobile device includes determining that the user has looked away from the mobile device based on an image of the user captured by the mobile device.

In some examples, determining that the user has looked away from the mobile device includes determining that an image captured by the head-mounted device does not include the mobile device.

In some examples, determining that the user has looked away from the mobile device includes determining that the user has looked away from the mobile device based on a determination that, based on multiple signals received by both the mobile device and the head-mounted device, a probability that the user has looked away from the mobile device satisfies a look-away probability condition.

In some examples, determining that the user has looked away from the mobile device includes determining that the user has looked away from the mobile device based on a determination that, based on signals generated by the mobile device and signals received from the head-mounted device, a probability that the user has looked away from the mobile device satisfies a look-away probability condition.

In some examples, the method 800 further includes determining that the user has looked toward the mobile device, and, in response to determining that the user has looked toward the mobile device, sending a stop direction instruction to the head-mounted device, the stop direction instruction instructing the head-mounted device to stop presenting the direction indication.

In some examples, the method 800 further includes presenting a description of the destination.

Figure 9:
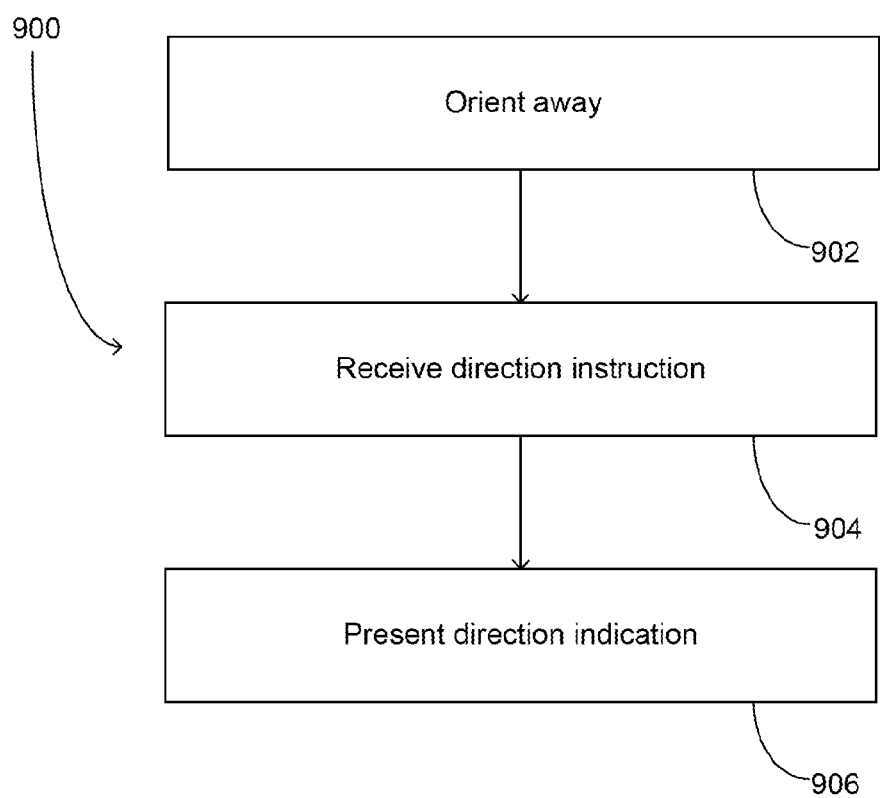
FIG. 9 is a flowchart showing a method performed by the head-mounted device.

FIG. 9 is a flowchart showing a method 900 performed by the head-mounted device 104. The method 900 includes orienting away from a mobile device 108 (902). In some examples, rather than orienting away from the mobile device 108 (902), the method 900 includes determining that a user wearing the head-mounted device has looked away from a mobile device and/or sending a signal to the mobile device based on an orientation of the head-mounted device that permits the mobile device to determine that the user has looked away from the mobile device. The method 900 includes receiving a direction instruction 216 from the mobile device 108 (904). In some examples, receiving the direction instruction 216 from the mobile device 108 (904) is performed in response to determining that the user has looked away from the mobile device. The method 900 includes presenting, based on the direction instruction 216, a direction indication 126A, 126B, 130 (906). The direction indication 126A, 126B, 130 indicates a direction to travel to arrive at a destination 128.

In some examples, the destination is outside a field of view of a user of the head-mounted device, and the direction indication includes a directional indicator.

In some examples, the destination is within a field of view of a user of the head-mounted device, and the direction indication is translucent and is disposed between an eye of the user and the destination.

In some examples, the method 900 further includes, before orienting away from the mobile device, presenting an identifier of the destination. In some examples, the identifier can be presented before determining that the user has looked away from the mobile device.

In some examples, the method 900 further includes continuing to present the identifier of the destination after orienting away from the mobile device. In some examples, continuing to present the identifier of the destination can be performed after the user has looked away from the mobile device.

In some examples, the method 900 further includes orienting toward the mobile device, and ceasing to present the direction indication. In some examples, rather than orienting toward the mobile device, the method can include determining that the user is looking toward the mobile device.

In some examples, the method 900 further includes orienting toward the mobile device, receiving a stop direction instruction from the mobile device, and in response to receiving the stop direction instruction, ceasing to present the direction indication.

Implementations of the various techniques described herein may be implemented in digital electronic circuitry, or in computer hardware, firmware, software, or in combinations of them. Implementations may implemented as a computer program product, i.e., a computer program tangibly embodied in an information carrier, e.g., in a machine-readable storage device, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the true spirit of the embodiments of the invention.

What is claimed is:

1. A method performed by a mobile device, the method comprising:

presenting a map, the map including a location indication, the location indication indicating a location of a destination;

in response to determining that a user has looked away from the mobile device, sending a direction instruction to a head-worn device, the direction instruction instructing the head-worn device to present a direction indication, the direction indication indicating a direction for the user to travel to arrive at the destination, the head-worn device being worn on a head of the user; and in response to determining that the user has looked back toward the mobile device, sending a stop instruction to the head-worn device, the stop instruction causing the head-worn device to cease presentation of the direction indication.

2. The method of claim 1, wherein the direction indication includes a directional indicator.

3. The method of claim 1, wherein the direction indication is translucent and is disposed between an eye of the user and the destination.

4. The method of claim 1, wherein determining that the user has looked away from the mobile device includes determining that the user has looked away from the mobile device based on at least one of:
   an orientation of the head-worn device;
   a movement of the head-worn device; or
   an acceleration of the head-worn device.

5. The method of claim 4, wherein determining that the user has looked away from the mobile device includes determining that the orientation of the head-worn device relative to a ground or a horizon exceeds a predetermined threshold angle.

6. The method of claim 4, wherein determining that the user has looked away from the mobile device includes determining that a distance between the mobile device and the head-worn device exceeds a predetermined threshold distance.

7. The method of claim 4, wherein determining that the user has looked away from the mobile device includes determining at least one of:
   a speed of the mobile device exceeds a predetermined threshold speed;
   an acceleration of the mobile device exceeds a predetermined threshold acceleration;
   a speed of the head-worn device exceeds the predetermined threshold speed; or
   an acceleration of the head-worn device exceeds the predetermined threshold acceleration.

8. The method of claim 1, wherein determining that the user has looked away from the mobile device includes determining that the user has looked away from the mobile device based on an image of the user captured by the mobile device.

9. The method of claim 1, wherein determining that the user has looked away from the mobile device includes determining that an image captured by the head-worn device does not include the mobile device.

10. The method of claim 1, wherein determining that the user has looked away from the mobile device includes determining that the user has looked away from the mobile device based on a determination that, based on signals generated by the mobile device and signals received from the head-worn device, a probability that the user has looked away from the mobile device satisfies a look-away probability condition.

11. The method of claim 1, further comprising presenting a description of the destination.

12. A method performed by a head-worn device, the method comprising:
- determining that a user wearing the head-worn device has looked away from a mobile device based on an orientation of the head-worn device;
- based on determining that the user wearing the head-worn device has looked away from the mobile device, sending a signal to the mobile device, the signal indicating that the user has looked away from the mobile device;
- in response to sending the signal to the mobile device, receiving a direction instruction from the mobile device; and
- presenting, based on the direction instruction and a determination that a destination is outside a field of view of the user, a direction indication, the direction indication indicating a direction to travel to arrive at a destination.

13. The method of claim 12, wherein the direction indication includes a directional indicator.

14. The method of claim 12, wherein the direction indication is translucent and is disposed between an eye of the user and the destination.

15. The method of claim 12, further comprising, before determining that the user has looked away from the mobile device, presenting an identifier of the destination.

16. The method of claim 15, further comprising continuing to present the identifier of the destination after determining that the user has looked away from the mobile device.

17. The method of claim 12, further comprising:
- determining that the user is looking toward the mobile device; and
- ceasing to present the direction indication.

18. The method of claim 12, further comprising:
- receiving a stop direction instruction from the mobile device; and
- in response to receiving the stop direction instruction, ceasing to present the direction indication.

19. A non-transitory computer-readable storage medium comprising instructions stored thereon that, when executed by at least one processor, are configured to cause a mobile device to:
- present a map, the map including a location indication, the location indication indicating a location of a destination;
- in response to determining that a user has looked away from the mobile device, send a first direction instruction to a head-worn device, the first direction instruction instructing the head-worn device to present a first direction indication, the first direction indication indicating a first direction for the user to travel to arrive at the destination, the head-worn device being worn on a head of the user;
- in response to determining that the user has not looked back toward the mobile device, send a second direction instruction to the head-worn device, the second direction instruction instructing the head-worn device to present a second direction indication, the second direction indication indicating a second direction for the user to travel to arrive at the destination, the second direction being different than the first direction; and
- in response to determining that the user has looked back toward the mobile device, send a stop instruction to the head-worn device, the stop instruction causing the head-worn device to cease presentation of either the first direction indication or the second direction indication.

* * * * *